United States Patent [19]

Vanderwal, Jr.

[11] 4,192,073
[45] Mar. 11, 1980

[54] PROCESS GAGING APPARATUS

[75] Inventor: Frank E. Vanderwal, Jr., St. Louis County, Mo.

[73] Assignee: Sunnen Products Company, St. Louis, Mo.

[21] Appl. No.: 872,557

[22] Filed: Jan. 26, 1978

[51] Int. Cl.[2] .......................... G01B 5/08; G01B 7/12
[52] U.S. Cl. ................................ 33/178 B; 33/178 E; 51/34 R
[58] Field of Search ............. 33/147 K, 168 R, 174 L, 33/178 B, 178 E; 51/2 B, 2 G, 2 H, 2 T, 2 V, 2 AA, 34 R, 34 C, 34 H

[56] References Cited

U.S. PATENT DOCUMENTS

| | | | |
|---|---|---|---|
| 2,502,862 | 4/1950 | Ljunggren | 33/178 B |
| 2,787,866 | 4/1957 | Gross | 33/178 B |
| 2,787,867 | 4/1957 | Klein | 33/178 B |
| 2,797,531 | 7/1957 | Seborg | 33/178 B |
| 2,820,328 | 1/1958 | Calvert | 33/178 B |
| 3,286,409 | 11/1966 | Greenberg | 51/34 R |

FOREIGN PATENT DOCUMENTS

| | | | |
|---|---|---|---|
| 1017046 | 10/1957 | Fed. Rep. of Germany | 51/34 R |
| 53319 | 1/1967 | German Democratic Rep. | 33/178 B |

*Primary Examiner*—Richard R. Stearns
*Attorney, Agent, or Firm*—Charles B. Haverstock

[57] ABSTRACT

An apparatus for gaging a workpiece surface during an enlarging operation thereon, said enlarging taking place by a working member which enters the work surface from one direction and by reciprocally moving the workpiece relative to the working member during said operation, said apparatus including a support structure with a gaging member thereon which is located to engage the workpiece opposite from the working member in position to be engaged by the workpiece adjacent to the workpiece surface during each cycle of reciprocal movement between the workpiece and the working member, said gaging member being of a size to be able to enter the workpiece surface only when the workpiece surface has been enlarged to some predetermined size, structure supporting the gaging member including a yieldable member on said support structure normally biasing said gaging member in a direction toward the workpiece, and mechanism for detecting movements of the gaging member relative to the support structure including a sensor operatively connected to the gaging member, which sensor includes a mechanism operable to distinguish when the gaging member moves into engagement with the workpiece at times when the gaging member is not able to enter the workpiece surface and when it is able to enter the workpiece surface. The detecting mechanism means include structure capable of producing a distinctive response indicative of at least one condition of the gaging member when engaged with the workpiece.

6 Claims, 7 Drawing Figures

PROCESS GAGING APPARATUS

Many devices have been made and used to gage a dimension on a workpiece such as the diameter of a bore therein during operation thereon for some purpose such as the purpose of sensing when a particular condition, such as a desired dimension, is reached so as to terminate the operation at that point or to perform some other function. Devices such as this are sometimes referred to as in process gaging devices. There are many known devices used for this purpose some of which use air or fluid pressure in their gaging processes, some use feelers or plungers of various types, and some use optical, magnetic and other type sensing means including devices which enter the work surface and devices which sense the condition of the work surface without entering the work surface. Some known devices also sense and gage the condition of the working member rather than the condition of the work. Some of these are also known as in process gaging devices and include means to automatically terminate an operation when a desired condition is reached. Some of the known devices have been constructed as part of the machine on which they are used and have included standards which are used to make comparisons between the work surface and another member during operation thereon. All of the known devices, however, have shortcomings and disadvantages and for various reasons are inaccurate, unstable, and unreliable for many purposes, and the known devices for the most part also produce some variation from part-to-part so that non-uniform parts are produced. The known devices are also relatively expensive to make, difficult to adjust, and time consuming to use, and many require special training and experience to operate satisfactorily. Also many of the known devices require external means in association therewith such as external pressure sources, pumps and other means and devices, none of which are required with the present in process gaging construction. The present in process gaging means overcome these and other disadvantages and shortcomings of prior art devices.

It is therefore a principal object of the present invention to teach the construction and operation of a relatively simple in process gaging device which can be installed as part of a new machine or added for use on an existing machine with minimum change or modification to the machine itself.

Another object is to provide improved means for the in process gaging of work surfaces during honing or other machine operations thereon.

Another object is to provide means to produce more uniformly honed and machined surfaces.

Another object is to provide in process gaging means which are relatively easy to install and set up, and relatively easy to change to gage different dimensional sizes.

Another object is to provide in process gaging means which can be accurately used even by persons having relatively little skill and training.

Another object is to provide means to monitor the progress of a machine operation on a workpiece so as to terminate the operation when a precise desired dimensional condition is reached.

Another object is to minimize machine down time required to install and adjust in process gaging equipment.

Another object is to provide in process gaging means which are particularly adaptable for use with honing, lapping and grinding operations.

Another object is to provide means to repeatedly check the size of a workpiece bore as it is being worked on by means which include a dimensionally precise size gaging head that repeatedly tries to enter the bore.

Another object is to use electromagnetic sensing means to produce a response necessary to terminate operation on a workpiece when a desired workpiece condition is reached.

Another object is to provide an in process gaging device which is relatively safe to use and cannot be easily damaged.

Another object is to provide a gaging device which, within limits, is self-centering.

Another object is to provide an in process gaging device which includes relatively simple yet highly accurate means for determining when a workpiece surface has reached a desired size, said gaging device including means to effect termination of an operation on the workpiece when the workpiece surface has reached a desired size.

Yet another object is to provide an in process gaging device which can be used to gage a relatively wide range of dimensional sizes.

These and other objects and advantages of the present invention will become apparent after considering the following detailed specification in conjunction with the accompanying drawings, wherein.

Figure 1:
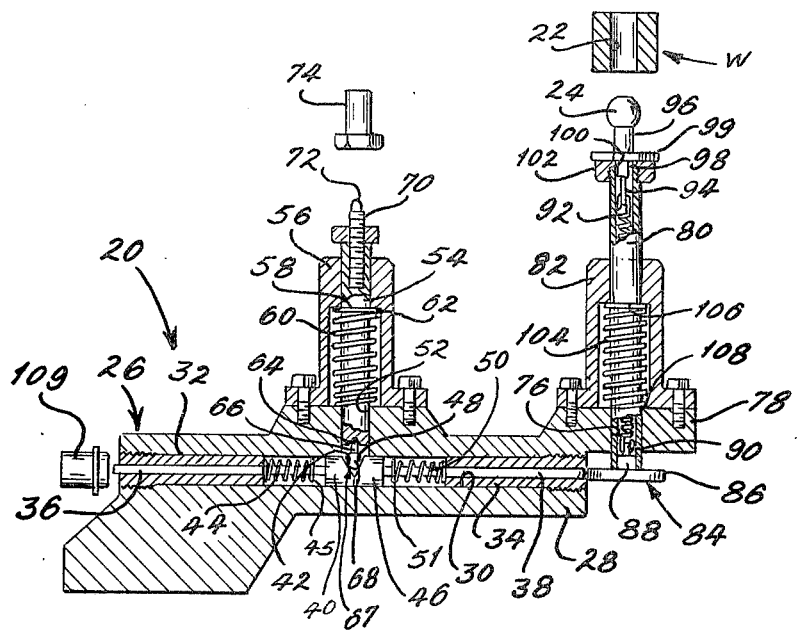
FIG. 1 is a cross-sectional view of one embodiment of an in process gaging device constructed according to the present invention, the device being shown in a non-work engaging portion of its operating cycle.

Referring to the drawings more particularly by reference numbers, number 20 refers to an in-process gaging device constructed according to the present invention. The device 20 is adapted to be installed on a machine such as a honing, grinding or like machine and is positioned thereon so that the work engaging portion of the device periodically engages the workpiece W as it is being honed, ground or machined and repeatedly tries to enter the work surface. Machines of a type on which the subject device is particularly adaptable for use are disclosed in Sunnen U.S. Pat. Nos. 2,377,588, 2,349,526, 3,393,472, and 3,618,268. In such machines and in others the workpiece W is supported for reciprocation by suitable reciprocating support means on the machine, and the tool or mandrel portion of the machine is rotated usually while in a fixed position. This means that the workpiece moves back and forth on the rotating mandrel as the mandrel performs its honing function. It is contemplated and within the scope of the invention, however, to alternatively reciprocate the mandrel or working member while maintaining the workpiece in a fixed position. In either case the work engaging portion of the present means must be so positioned as to repeatedly try to enter the work surface being operated on which is shown as being cylindrical opening or bore 22 extending through the workpiece W. The surface of the bore 22 is the surface that is honed or machined and also gaged. During operation and while the workpiece W (or mandrel) is reciprocating back and forth, the workpiece repeatedly moves against the gaging head portion of the subject in process gaging means. The head portion is identified in the drawing as gaging head 24. The size or diameter of the gaging head 24 is accurately preformed so that it will only be able to enter the bore 22 when the bore has reached the precise dimension of the gaging head 24. The gaging head 24 can have many different forms but all are constructed to be able to enter the work surface or bore only when the surface has reached a precise size.

Figure 2:
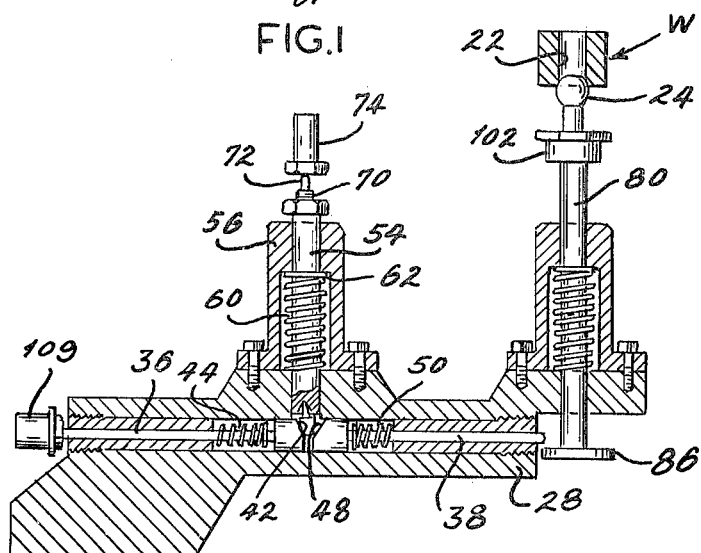
FIG. 2 is a cross-sectional view similar to FIG. 1 but showing the work engaging portion of the present device unsuccessfully trying to enter a bore in a workpiece being operated on and gaged.
Figure 3:
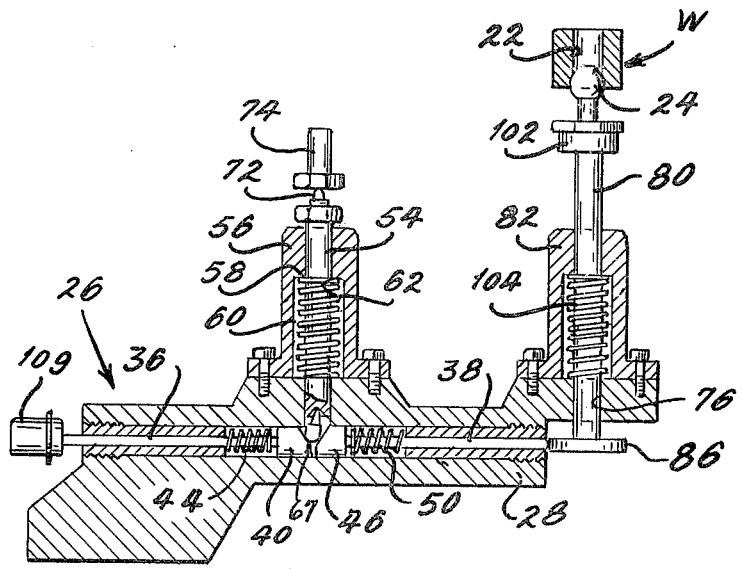
FIG. 3 is a cross-sectional view similar to FIG. 1 showing the work engaging portion of the device entering the bore when the desired bore size has been reached.

The subject device includes a housing structure 26 which is fixedly attached to the honing machine in a position corresponding to that shown in FIG. 1-3. The housing includes an elongated body portion 28 with a bore 30 extending lengthwise therethrough. The bore 30 as shown has space aligned sleeve members 32 and 34, and each of the sleeves 32 and 34 is fixedly positioned in the bore 30 and slidably receives a respective rod or plunger member 36 and 38. The plunger member 36 has an enlarged portion 40 attached to one end and the enlarged portion 40 has a beveled surface 42 formed on the free end thereof. A spring 44 is positioned in the bore 30 between the sleeve 32 and a collar 45 on the plunger 36 in position to normally bias the plunger member 36, including the enlarged portion 40, in the direction indicated. The plunger member 38 likewise has an attached enlarged portion 46 similar to the portion 40, and the portion 46 likewise has a beveled end surface 48 positioned in opposed relation to the beveled end surface 42 on the portion 40 as shown in FIGS. 1-3. Another spring 50 is positioned in the bore 30 between the sleeve 34 and another collar or ring 51 on the plunger 38 to bias the plunger 38 toward the plunger 36.

The structure 26 has another bore 52 shown at right angles to the bore 30. The bore 52 intersects the bore 30 at the location where the opposed beveled surfaces 42 and 48 on the portions 40 and 46 are located, and another plunger member 54 is positioned in the bore 52 and extends therefrom through a tubular member 56 which is attached to the housing structure. The plunger member 54 carries an annular ring 58 which engages one end of a compression spring 60, the opposite end of which bears against a surface of the housing 26 adjacent to the bore 52. The spring 60 is provided to normally bias the plunger member 54 outwardly to the position shown in FIG. 1 wherein the ring 58 is against a shoulder 62 formed in the member 56. This abutment limits outward movement of the plunger 54.

The inner end of the plunger member 54 has a centrally located tapered hole or socket 64 formed therein, and the socket 64 cooperates with tapered end portion 66 of a member 67. The opposite or lower end of the member 67, as shown, is formed by rounded portion 68 which is biased against the opposed beveled end surfaces 42 and 48 on the portions 40 and 46 by the compression spring 60. The end of the plunger 54 that extends from the tubular member 56 threadedly receives a member 70 which has a endwardly projecting portion 72. The extension of the portion 72 is adjustable and the portion 72 is positioned to cooperatively engage a stop member 74 fixedly located on the honing or other machine under certain circumstances which will be described later.

The housing 26 has another bore 76 which is also normal to the bore 30 and is located on a housing extension 78 which is beyond one end of the bore 30. The bore 76 receives another movable plunger assembly 80 which is shown as being tubular. The plunger assembly 80 also extends through another tubular housing portion 82 which is attached to the housing 26, and one end of the plunger assembly 80 carries a member 84 which has different diameter portions 86 and 88. The smaller diameter portion 88 is positioned extending into the end of the tubular assembly 80 and the larger diameter portion 86 abuts against the end of the assembly 80. The portion 88 has a loop 90 attached thereto and one end of a spring 92 is attached to the loop 90. The opposite end of the spring 92 is connected to another loop 94 attached to the gaging head 24 to retain the head on the tubular assembly 80.

The gaging head 24 has a cylindrical portion 96 which in turn is connected to a smaller diameter cylindrical portion 98. An annular flange 99 is located between the portions 96 and 98 and abuts a cap member 102 which is attached to the end of the tubular assembly 80 when the portion 98 is positioned extending into an opening 100 in the cap 102. The opening 100 is preferably somewhat larger in diameter than the diameter of the gaging head portion 98 so that the gaging head 24 is permitted to have some free lateral and/or tilting movement in the opening 100. This is to enable the gaging head 24 which has an annular and preferably somewhat rounded or tapered gaging surface to be able, within limits, to self-align and self center itself to the bore 22 during gaging operations. It is expected, however, that the amount of possible lateral or tilting movement will be minimal.

In the usual situation, the structure 20, including the housing portion 26, is attached to the machine on which it is used in such a manner that it can be moved or pivoted from an inoperative position in which the gaging head 24 is out of alignment with the bore 22 and an operative position wherein the gaging head 24 is axially aligned with the bore 22. In the operative position the member 72 is also aligned with the member 74. In the inoperative position of the structure 20 the gaging head 24 can be replaced by a different size or type head to gage a different diameter bore.

Various operative positions of the gaging head 24 are shown in FIGS. 1-3. In FIG. 1 the device is shown in its operative position during a honing or machining operation wherein the workpiece W is spaced from the gaging head 24. As the honing operation continues the workpiece W moves back and forth in a reciprocating motion and in so doing, the workpiece will repeatedly move against the gaging head 24, and each time the gaging head 24 engages the workpiece it will try to enter the bore 22. This can be assured by making the end portion of the gaging head 24 somewhat rounded or tapered as aforesaid. However, until the bore 22 has been honed or machined to the desired size as determined by the size or diameter of the gaging head 24, the gaging head will be unable to enter the bore 22 and hence the gaging head 24 and the tubular plunger assembly 80 will be pushed backwards into the bore 76 in opposition to the compression force of compression spring 104 which is positioned in the housing portion 82 between an annular collar 106 attached to the tubular plunger assembly 80 and shoulder 108 which is formed on the housing structure 26 at the location shown. As long as the gaging head 24 is unable to enter the bore 22, it will be pushed by the workpiece W during each operating cycle in opposition to the compression force of the spring 104 to the position shown in FIG. 2. This will continue until the surface of the bore 22 has been honed or machined to a large enough diameter so that the gaging head 24 can enter it. When this occurs, the gaging head 24 (FIG. 3) will be able to enter the bore 22, and the tubular assembly 80 will therefore no longer be pushed to the position as shown in FIG. 2. Instead the plunger assembly 80 will remain in its extended position as shown in FIG. 3, wherein the gaging head 24 is shown having entered the bore 22.

In the situation shown in FIG. 2 wherein the gaging head 24 is engaged with the workpiece W but is not able to enter the bore 22, the enlarged portion 86 of the member 84 will have been moved to a position out of alignment with the adjacent end of the plunger member 38 such that the plunger member 38 is able to move to the right as shown. Under these circumstances when the member 72 moves against the fixed member 74, the member 67 including the rounded portion 68, will be forced by the pressure on the members 72 and 54 to a position between the beveled surfaces 42 and 48 of the respective plunger portions 40 and 46 to separate the members by moving them apart. At these times, the plunger member 36 being also aligned with the plunger member 38 tries to move against a switch actuator member 109. However, as long as the plunger member 38 is able to move unimpeded to the right as described, any movements of the member 67 between the plunger members 36 and 38 is ineffective to apply force against the switch actuator 109 to operate the associated switch means. This means that as long as the gaging head 24 is not able to enter the bore 22 it will also be impossible to apply sufficient pressure against the switch actuator 109 to actuate the associated switch means. The switch which is operated by actuations of the actuator 109 is connected into a circuit which controls the de-energizing of the honing or other machine, but the particular form of circuit means employed are not part of the present invention and can have many forms.

When, however, the gaging head 24 finally is able to enter the workpiece bore 22 as shown in FIG. 3, the enlarged portion 86 of the member 84 will no longer be moved out of position aligned with the end of the plunger 38, and the plunger 38 will therefore be prevented from being able to move to the right as shown in FIG. 2. Under these circumstances when the member 72 moves against the fixed member 74 the member 67 will be forced to move between the beveled surfaces 42 and 48 of the respective members 40 and 46. Now, however, the member 38 is not able to move to the right because of its engagement with the portion 86, and instead the plunger member 36 will be forced to move to the left against the switch actuator member 109. This will cause the actuator 109 to move and to actuate the associated switch means to initiate circuits to terminate the honing or machining operation. Various forms of electrical and/or mechanical switch means can be used for the actuator 109. It is important to note that it only takes one cycle of operation or reciprocation of the workpiece W to be able to sense the desired hole size and to actuate the switch means to terminate the operation. This is important to the accuracy and consistancy of the results obtained when using the present device. The embodiment as disclosed in FIGS. 1-3 is basically mechanical in nature and can be used with many different kinds and styles of gaging heads which are not part of this invention as such. As already stated the present device can be used with machine tools wherein the workpiece is reciprocated as well as with tools wherein the workpiece is stationary and the working member is reciprocated. The principles of operation are basically the same in both cases.

Figure 4:
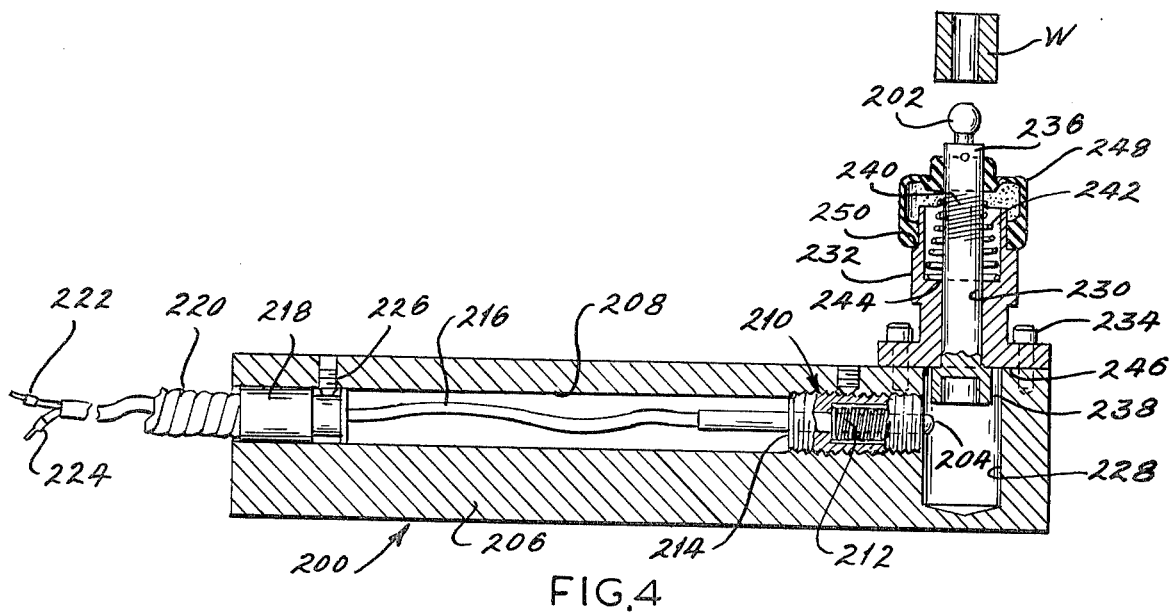
FIG. 4 is a cross-sectional view showing another embodiment of the subject in-process gaging device.

FIG. 4 shows another embodiment 200 of an in process gaging device which, like the embodiment 20, is shown fixedly mounted on a machine such as a honing or grinding machine in position to have its work engaging portion or head 202 aligned with a bore in a workpiece to be gaged. The embodiment 200 like the embodiment 20 during operation is maintained in a stationary position on the honing or machining device while the workpiece is reciprocated relative to the gaging head. If the device 200 (or 20) were instead to be mounted on a reciprocated portion of the machine rather than on the stationary portion the gaging head would then follow the movements of or move with the reciprocated working member while the workpiece is stationary. Otherwise the operation would be the same.

The modified construction 200 differs from the construction 200 in several important respects including in the manner in which the head 202 operates to produce the responses necessary to distinguish or sense when the desired bore size is reached. The modified construction 200 unlike the construction 20 employs means that establish a sensing zone 204 where a field of known size and shape is produced. The zone 204 can be an electric field or zone, a magnetic field or an electromagnetic field. The zone 204 is established adjacent to means which are attached to the gaging head 202 and in position so that the zone will be interrupted or changed of modified in some way by certain movements of the gaging head 202 as will be explained. The device 200 includes a support structure or housing 206 which in the embodiment disclosed is fixedly attached to the honing machine during operation. However, the device is also preferably mounted on a pivot assembly 207 which enables it to be moved from its operative to an inoperative position for various reasons particularly for convenience when changing gaging heads. The housing 206 has a passage 208 which extends longitudinally therethrough, and the passage 208 receives an inductive proximity sensor device 210 which is shown threadedly positioned therein and includes a coil or coils portion 212 mounted on a spool or like core member, not shown. The coil 212 is connected to external circuit means by leads 222 and 224 located in a suitable cable 216 which extends through the passage 208 and through a fitting 218 mounted in the free end thereof opposite from the sensor device 210. The fitting 218 is shown locked in position in the passage 208 by set screw 226. The fitting 218 receives one end of a flexible cable jacket 220 through which the cable 216 extends. During operation the sensor device 210 is energized electrically and this causes the sensing zone 204 to be established. Thereafter, whenever the sensing zone 204 is interrupted or changed as will be explained, the change will produce an affect or signal in the sensor 210 and in the leads 222 and 224. The signals thus produced can be detected and made use of. In the usual situation these signals are amplified by suitable means (not shown) and are used to operate electrical means such as relays or the like to terminate the machine operation or to perform some other function. The details of the circuits required are not per se part of the present in process gaging means and can have many different forms.

The sensor 210 extends to adjacent to the end of the passage 208 where the passage 208 intersects another passage or counterbore 228. The counterbore 228 is aligned with another bore 230 in a member 232 which is attached by means such as by screws 234 to the housing structure 206. A sensing plunger 236 is positioned extending through the bore 230 and into the counterbore 228 and carries an enlarged diameter cup-shaped portion 238 on the free end thereof in the counterbore 228. The diameter of the sensing plunger 236 is preferably made slightly smaller than the diameter of the bore 230 to provide for the possibility of some limited amount of sideward or tilting movement of the sensing plunger 236 so that the sensing head 202 can move laterally to a limited extent to be able to align itself to a bore in a workpiece being gaged. In the construction as shown in FIG. 4 the outer surface of at least a portion of the sensing plunger 236 is threaded as at 240, and a tapered spring member 242 has one of its end portions of a size and shape to be threaded onto the plunger 236. The opposite larger diameter end of the spring 242 bears against a seat or shoulder 244 formed in the member 232. The spring 242 therefore urges the plunger member 236 in a direction to move the cup-shaped member 238 into abutment with surface 246 on the member 232 to limit the outward or extended position of the gaging head 202.

The size and shape of the cup-shaped member 238 is selected so that the end edge thereof extends to closely adjacent to but preferably not in contact with the sensing zone or field 204 when the gaging head 202 is in its most extended position as shown in FIG. 4. The size and shape of the sensing zone may vary somewhat but should be fairly accurately known. Also, the distance between the end of the cup-shaped member 238 and the effective sensing zone 204 should be fairly precisely known since this distance is a measure of how far the head 202 and the connected cup-shaped member 238 needs to move in order to produce a detectable change in the sensing zone 204. This distance should be made to be relatively small for the most precise operation. In an actual device used in connection with a honing operation the distance between the cup-shaped member 238 and the sensing zone 204 in the inoperative position is maintained between about an eighth to a sixteenth of an inch or less although obviously much greater distances can also be used. The main advantage of having a relatively small distance between the cup-shaped member 238 and the zone 204 is that the sensing head 202 does not need to move very far when failing to enter a bore to produce a detectable field change or signal for shut-off purposes. The quicker this response occurs as the head 202 moves against the bore the greater will be the accuracy of the finished product and the less will be the wear on the gaging head due to rubbing on the work surface.

The length of the cup-shaped members 238 in the axial direction should also be selected so that regardless of the distance that the sensing head 202 has to be moved by the workpiece during stroking thereof, the cup-shaped member 238 will only be able to produce one interruption of the sensing zone 204 for each cycle of operation. This means that whenever the sensing head 202 is moved by the workpiece, the cup-shaped member 238, regardless of the distance it moves, will only be able to move into the sensing zone 204 one time and therefore no more than one change in the sensing zone 204 and one signal can be produced during each cycle of operation.

The device 200 is also shown including a flexible dust seal member 248 which has an enlarged portion that is positioned on a shoulder 250 formed on the member 232 and a smaller diameter portion resiliently engaged with the sensing plunger 236.

Various forms and embodiments of the work engaging member or head 202 can be used on the subject device and each is characterized in that it has an appropriate diameter so that it can only enter a workpiece bore when the bore reaches the desired final size. The particulars of the gaging head 202 are not part of the present invention as such. It is sufficient for this case to recognize, that the sensing head 202 (or 24) must be constructed so as to be able to be mounted on a threaded or like member such as the threaded member 251 (FIG. 5) on the member 236 (or 80) in position to repeatedly try to enter the bore. Also in the embodiment shown in FIGS. 4-6, as long as the head 202 is unable to enter the workpiece bore the sensing zone 204 will repeatedly be interrupted and a signal will be produced, and only when the head 202 is finally able to enter the work surface will the cup-shaped member 238 not be moved into a position to interrupt the sensing zone 204. Under this condition no signal will be produced, and, as will be explained, this absense of signal will be made use of to stop the machine operation or perform some other desired function.

Figure 6:
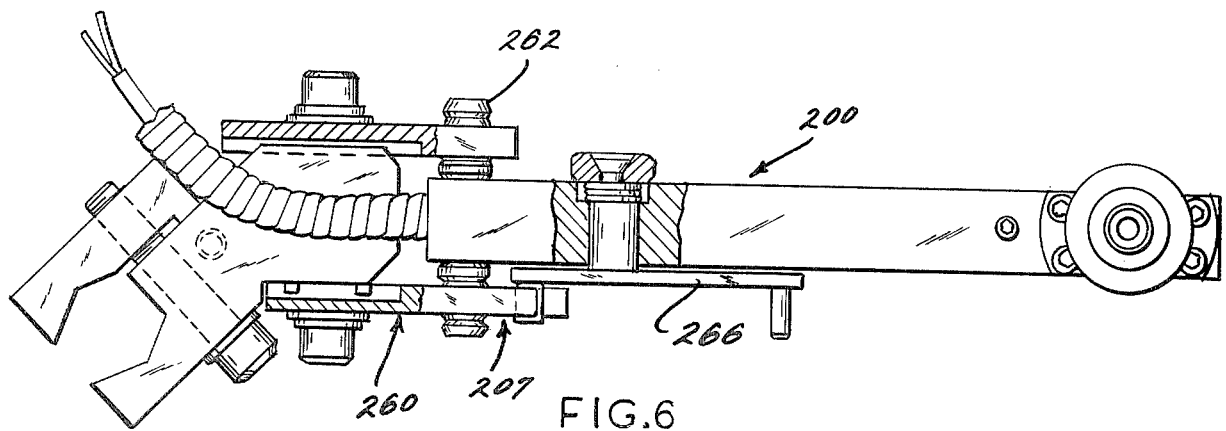
FIG. 6 is a top view of the device as shown in FIG. 6.
Figure 5:
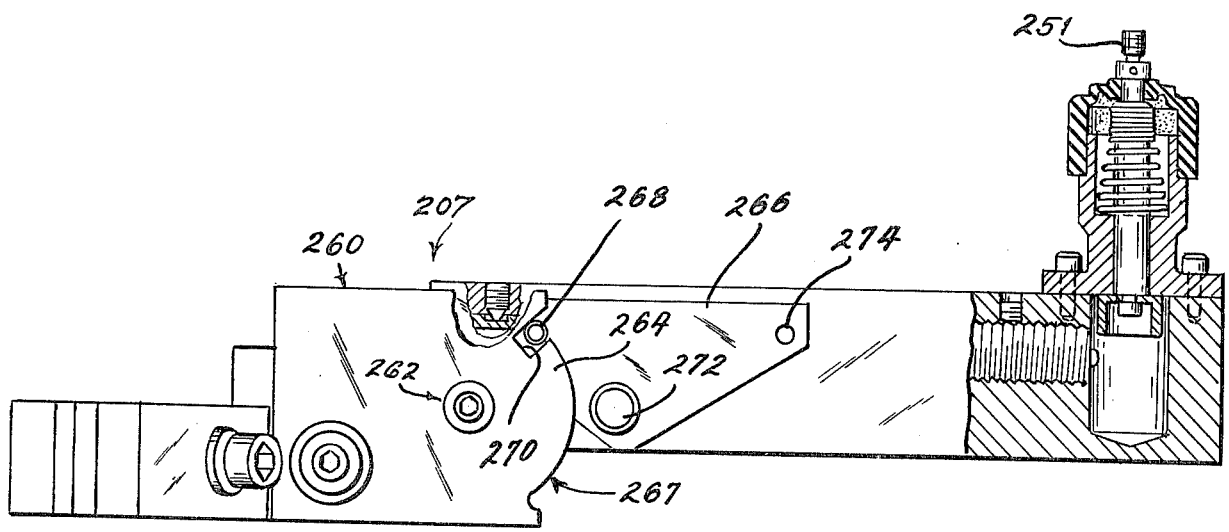
FIG. 5 is a side view partly in section showing the mounting means for the modified embodiment of FIG. 4.

FIGS. 5 and 6 show the mounting means 207 for mounting the subject devices 20 and 200 on the honing or other machine. The means 207 include means to hingedly mount the device 200 (or 20) on the honing machine. These means include a fixed support structure 260 which is attached to the honing machine and the subject device 200 is pivotally connected to the structure 260 by frictional pivot means 262. The means 207 also include locking means made up of the contoured portion 264 of the structure 260 and a pivot latch member 266. The member 266 is spring biased or otherwise maintained in its latched condition which is the condition shown wherein pin 268 on the latch member 266 cooperates with notch 270 in the contoured portion 264. The member 266 is pivoted on the device 200 about shaft 272 by means of a handle 274. The latch feature is included to enable the device 200 to be moved from its operative or latched position as shown to a position in which the gaging head 202 (or 24) is out of alignment and spaced from the work. This is a convenient feature that is useful when changing gaging heads and performing other maintenance and repairs.

Figure 7:
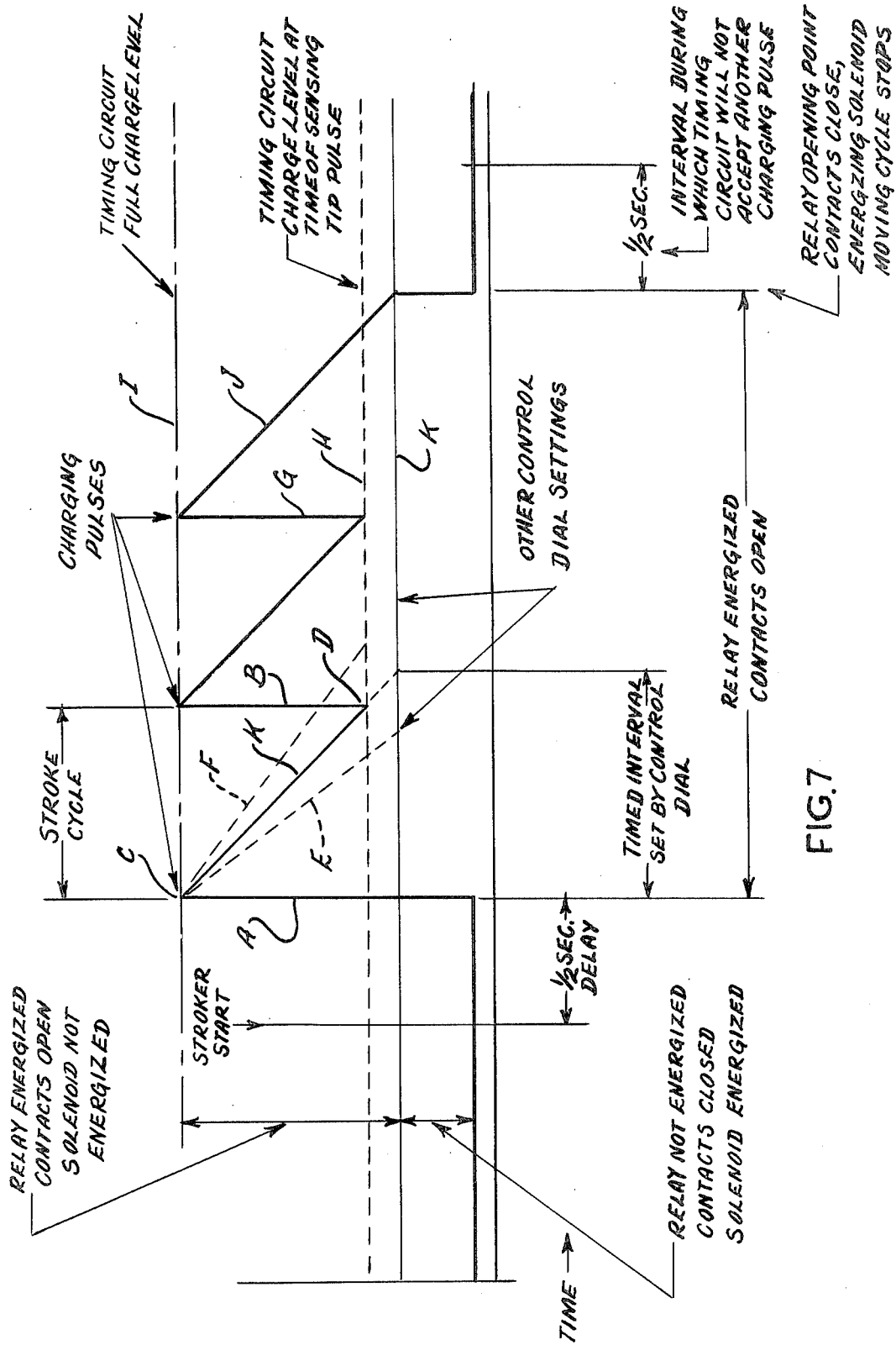
FIG. 7 is a graph of voltage as a function of time.

FIG. 7 is a chart for use in better understanding the operation of the gaging device of FIG. 4. The chart illustrates several cycles of machine operation, the first cycle or stroke of machine operation commencing at line A and extending to line B. During this time interval the charge on a capacitor in an associated circuit (not shown) dissipates from a high initial voltage at C to a lower voltage at D. When the low voltage condition is reached the capacitor will be recharged more or less instantaneously to voltage C if the gaging head 202 is unable to enter the bore in the workpiece. The charging of the capacitor is under control of the signals produced due to changes in the sensing zone 204. The charging and discharging rates of the capacitor are under control of the time constant of the circuit in which the capacitor is connected. If the circuit time constant is changed the capacitor discharge rate will also change as illustrated by dotted lines E and F. Such changes can be made by adjusting a potentiometer or like device connected into the capacitor discharging circuit and mounted conveniently on the machine. During the time that the head 202 is unable to enter the workpiece bore, similar cycles will reoccur as indicated by the solid zigzag line, two similar cycles of operation being shown in FIG. 7, and a third different length cycle will occur when the head 202 is able to enter the workpiece bore. Each stroke cycle (which is approximately the time the remaining charge on the capacitor reaches the voltage level at H), a charge impulse will be produced and applied to recharge the capacitor to voltage level I under control of means responsive to the changes sensed in the zone 204. In order to produce the pulses necessary for recharging the capacitor it is necessary for the cup-shaped member 238 to interrupt the sensing zone 204 as aforesaid so that the sensor 210 will detect the changes and produce output signals which can be used to cause a charging voltage to be applied to the capacitor to recharge it. Thereafter when the desired bore size is finally reached and the gaging head 202 is able to enter the workpiece bore, the sensing plunger 236 will not move relative to the housing member 232 and the cup-shaped member 238 will therefore not interrupt the sensing zone 204. Under these conditions, no output signal will be produced by the sensor 210 to be used to recharge the capacitor and the capacitor will continue to discharge. This is illustrated by line J in FIG. 7, and this condition will continue until the charge on the capacitor reaches the still lower voltage level K. This is the voltage level that must be reached in order to cause a relay or some other device (not shown) to operate means to terminate the operation. Thus while the machine operation is proceeding and the work is being reciprocated the operation will continue until such time as the head 202 is able to enter the work surface to terminate the operation.

Referring again to FIG. 7, the dotted lines E and F represent different operating conditions or frequencies of the honing machine. Dotted line E represents a condition where the cycle duration is reduced or shortened and the frequency increased, and dotted line F indicates operation for a longer cycle duration and hence for a lower operating frequency. The manner in which the signals are used that are produced, or not produced, by reason of changes in the sensing zone 204, is not part of the present invention as such.

In a machine such as the honing machine shown in Sunnen U.S. Pat. Nos. 2,377,588, 2,349,526, 3,393,472 and 3,618,268, the stroking frequency of the machine is adjustable as by changing the pulley ratio between a driving and a driven pulley. If the line K represents the stroke frequency in a mid range condition, dotted line E represents the condition where the stroking frequency is more rapid and line F represents the condition for a longer duration stroking cycle. The subject gaging device can be adjusted to be used under all these conditions simply by adjusting a variable resistor or potentiometer (not shown). Regardless of the stroke frequency, however, the charging capacitor will receive a charging pulse each time the cup-shaped member 238 interrupts the field or zone 204 but not otherwise.

It is also possible to operate the device with the target member 238 having a relatively thin edge rather than being cup-shaped, as shown, and placed so that in its at rest position it extends into the sensing zone 204. In this case a pulse is produced by moving the target member out of the zone 204 when the workpiece is engaged by the gaging head 202. In such a structure the chp-shaped member 238 would be replaced by a member such as the member 84 in FIGS. 1-3. The pulse or signal that is produced by changes that occur in the sensing zone 204 can be produced as the target member moves into the sensing zone 204 or as it leaves the sensing zone 204.

It has been found that by properly adjusting the position of the cup-shaped member 238 relative to the sensing zone 204 it is possible to also accurately control the extent of penetration of the sensing head 202 into the bore that is required to produce enough change in the sensing zone to cause the capacitor to be recharged. This condition is adjusted by adjusting the at rest position of the cup-shaped member 238 relative to the sensing zone. This distance is a measure of the amount that the sensing head must move into the bore before the sensing zone will be interrupted sufficiently to produce a signal. It has also been found that the cup-shaped member 238 can be made to have various sizes and shapes and can even be substituted for by providing a suitable extension on the plunger member 236. The shape and size of this member is not especially important as long as the member is constructed and positioned so as to interrupt the sensing zone 204 in the manner illustrated and described, and preferably not more than once during each operating cycle. The details of the circuit means employed for use with the present device can have many different forms and are not part of the present invention as such.

Thus there has been shown and described several embodiments of a novel in process gaging device which is extremely accurate and versatile and can be used to terminate a machine operation or perform some other function when a precisely determined condition of the surface being operated on has been reached. Many changes, modifications, variations and other uses and applications of the subject device will become apparent to those skilled in the art after considering this specification and the accompanying drawings. All such changes, modifications, variations, and other uses and applications of the device which do not depart from the spirit and scope of the invention are deemed to be covered by the invention which is limited only by the claims which follow.

What is claimed is:

1. Apparatus for determining when a work surface on a workpiece being honed by a honing machine has been honed to a desired diameter including means for supporting the workpiece during honing thereon, a honing mandrel mounted on the honing machine and extending into the work surface to be honed, means for rotating the honing mandrel while maintaining the mandrel engaged with the work surface being honed, means for producing relative reciprocal motion between the honing mandrel and the workpiece whereby the mandrel and the workpiece move axially relative to each other, comprising a gaging structure mounted on the honing machine in fixed axial relation to the mandrel and in position to move axially relative to the workpiece during honing thereof, a first plunger member mounted on said gaging structure in position aligned with the work surface adjacent one end thereof and in spaced opposed relation to the mandrel, a work engaging member on said first plunger member, said work engaging member being of a size and shape to be able to enter into the work surface only after the work surface has been honed to some precise desired size, means normally biasing said first plunger member on said gaging structure toward the workpiece, said work engaging member moving into engagement with the workpiece adjacent to the work surface during a portion of each cycle of relative reciprocal motion between the workpiece and the mandrel, said first plunger member moving relative to the gaging structure when the workpiece moves against the work engaging member at times when the work engaging member is not able to enter the work surface, and means for distinguishing between engagements of the workpiece by the work engaging member when the work engaging member is not able to enter into the work surface and when the work engaging member is able to enter into the work surface, said last named means including a second plunger member mounted on the gaging structure in spaced relation to the first plunger member, said second plunger member being engageable during a portion of each cycle of relative reciprocal motion by means fixedly attached with respect to the means for supporting the workpiece, means forming an operable connection extending between the first and second plunger members, and means to disable said connection whenever the work engaging member on the first plunger member is not able to enter the work surface being honed and the second plunger member engages the means fixed to the workpiece.

2. Apparatus for terminating a machine operation on a workpiece having a surface thereon to be machined when a predetermined condition of a workpiece surface is reached comprising working means engageable with said workpiece surface during machining thereof, means for producing relative reciprocal motion between the workpiece and the working means during a machine operation, gaging means positioned adjacent to the workpiece surface being machined in spaced opposed relation to the working means and on the opposite side of the workpiece therefrom for determining when the surface is machined to a desired condition, said gaging means including a support structure mounted on the machine in fixed spaced relation to the working means, a gaging member mounted on the support structure in position to engage the workpiece adjacent to the workpiece surface during part of each cycle of relative reciprocal motion, said gaging member having a work engaging portion of predetermined dimensional characteristics capable of entering the workpiece surface only after the workpiece surface has been machined to some predetermined size, means operatively connected to the support structure biasing said work engaging portion of the gaging member toward the workpiece, said workpiece moving against said work engaging portion during each cycle of reciprocating movement of the workpiece relative to the working means and relative to the support structure, and other means on the support structure responsive to the position of the gaging member thereon, said other means including a second member mounted on the support structure in spaced relation to the work engaging portion of the gaging member, said second member being engageable during a portion of each cycle of relative reciprocal motion by means fixedly attached with respect to the meand for supporting the workpiece, means forming an operable connection between the work engaging portion and the second member, and means on the gaging member movable to disable the connection means whenever the work engaging portion engages the workpiece but is not able to enter the work surface.

3. Apparatus to sense when a cylindrical surface in a workpiece that is being enlarged has reached a predetermined diameter, the cylindrical surface having a diameter initially less than the predetermined diameter, and working means operatively engageable with said cylindrical surface for enlarging the surface, said working means being positioned to enter the cylindrical surface from one end thereof, means for producing relative reciprocal movement between the working means and the cylindrical surface, the improvement comprising means movable into engagement with the workpiece adjacent to the opposite end of said cylindrical workpiece surface from the end where the working means enters including a gaging assembly having a support structure that is fixed relative to the working means, a gaging head on said support structure characterized by being able to enter the cylindrical surface only after the diameter of the cylindrical surface has been enlarged to said predetermined diameter, said gaging head being positioned on the gaging assembly in position to move against the workpiece adjacent to said cylindrical surface during a portion of each cycle of said relative reciprocal movement, means biasing the gaging head on the support structure toward the workpiece and toward the working member, and means for distinguishing between the movements of the gaging head on the support structure in opposition to the biasing means during succeeding cycles of relative reciprocal movement when the gaging head moves against the workpiece and is able to enter the cylindrical surface and when the gaging head moves against the workpiece and is not able to enter the cylindrical surface, said means for distinguishing including means for establishing an energy zone adjacent to the gaging assembly and on the side of the workpiece surface opposite from the end where the working means enter, and means connected to the gaging head movable into the energy zone during a portion of each cycle of relative reciprocal movement thereby producing an output signal every time the gaging head is engaged with the workpiece but is unable to enter the cylindrical workpiece surface, said means connected to the gaging head not moving into the energy zone during the first cycle of relative reciprocal movement when the gaging head is able to enter the cylindrical workpiece surface so as not to produce an output signal.

4. The apparatus defined in claim 3 wherein the energy zone undergoes a change that produces a signal each time the means connected to the gaging head enters the energy zone.

5. The apparatus defined in claim 3 wherein the energy zone undergoes a change that produces a signal each time said means connected to the gaging head leaves the energy zone.

6. The apparatus defined in claim 3 wherein the energy zone is an electromagnetic energy zone.

* * * * *

UNITED STATES PATENT OFFICE
CERTIFICATE OF CORRECTION

Patent No. 4,192,073          Dated March 11, 1980

Inventor(s) Frank E. Vanderwal, Jr.

It is certified that error appears in the above-identified patent and that said Letters Patent are hereby corrected as shown below:

Column 6, line 29 "200" should be --20--

Column 9, line 55 "Sunnen U. S. Patent Nos." should be --Sunnen Patent Nos.--

Column 12, line 2 "meand" should be --means--

Signed and Sealed this

Eighth Day of July 1980

[SEAL]

Attest:

SIDNEY A. DIAMOND

Attesting Officer     Commissioner of Patents and Trademarks